(No Model.)
A. BRADY.
WHEEL TIRE.
No. 244,373. Patented July 19, 1881.
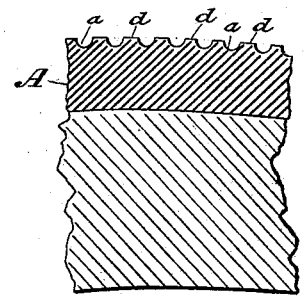
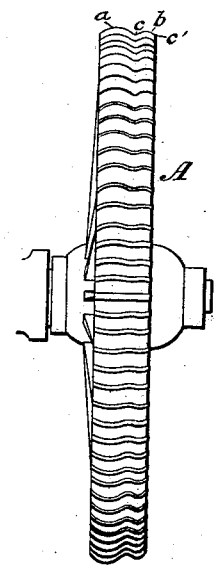
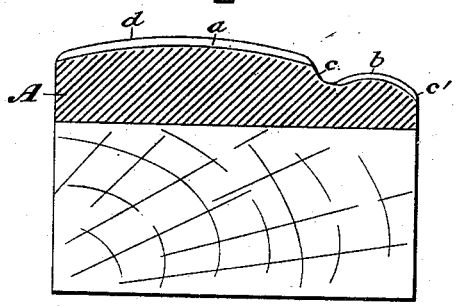
WITNESSES:
INVENTOR:
Alfred Brady
By his Attorneys,

UNITED STATES PATENT OFFICE.

ALFRED BRADY, OF NEW YORK, N. Y.

WHEEL-TIRE.

SPECIFICATION forming part of Letters Patent No. 244,373, dated July 19, 1881.

Application filed June 8, 1881. (No model.)

*To all whom it may concern:*

Be it known that I, ALFRED BRADY, a citizen of the United States, residing in the city, county, and State of New York, have invented certain Improvements in Wheel Tires or Rims, of which the following is a specification.

The object of my invention is to provide a tire or wheel-rim that will enable the wheel to readily mount an ordinary tramway-rail and to run either on said tramway-rails or tracks, or on the ground, as may be desirable or necessary.

In tires as ordinarily constructed for wheels intended for road-travel only any attempt to cross the raised rails of a tramway obliquely, or to get onto said track, requires a very hard pull and strains the wheels very much. Indeed it is almost impossible to cross such tracks obliquely with the ordinary wheel-rim, and it is necessary that the vehicle shall be turned so as to cross at a right angle. In endeavoring to get off the track when once on the vehicle is also subjected to a very severe strain. My present invention seeks to obviate this by recessing the tire or rim circumferentially next the outside of the wheel, and rounding off the angles at the junction of the recessed portion with the main face of the tire. The recessed and main faces of the tire are both made convex by preference, and both roughened by cross-corrugations, all as will be more fully hereinafter set forth.

In the drawings, which serve to illustrate my invention, Figure 1 is an edge view of a wheel provided with a tire embodying my improvements. Fig. 2 is an enlarged fragmentary section taken in a plane at right angles to the axis of the wheel. Fig. 3 is an enlarged fragmentary section taken in the plane of the axis of the wheel.

Let A represent a wheel tire or rim of metal, which is herein represented as shrunk on an ordinary truck-wheel. This tire has a convex face or tread, $a$, shown as extending about two-thirds of the way across the tire, and another recessed or depressed face or tread, $b$, also slightly convex, and joined to the face $a$ by a reverse curve, $c$. (Best shown in Fig. 3.) The outer corner, $c'$, is also rounded. The faces $a$ and $b$ are both roughened by means of cross-corrugations $d\ d$, as shown in Fig. 2, whereby they are enabled to take a better hold in climbing onto the rail of a tramway. These corrugations may extend square across the face of the tread, or may be zigzag, curved, or oblique, as desired. The main tread, $a$, of the wheel raises the narrower tread $b$ up from the level on which the former runs, and the latter, which is on the outside, is enabled to ride the more readily onto the rail of the tramway when the latter is approached obliquely. The reverse curve $c$ and the rounded corner $c'$ also aid in this operation and in getting off the rails again.

My invention may be applied to wheel-rims of all kinds, and for vehicles of every variety; but it is especially adapted to the wheels of trucks which are used on streets having horse-car tracks laid therein.

Having thus described my invention, I claim—

1. A wheel rim or tire having a main face or tread, $a$, and a recessed face or tread, $b$, the two faces being connected by a reverse curve, $c$, as shown, for the purposes specified.

2. A wheel rim or tire, A, having a main face or tread, $a$, and a narrower recessed tread, $b$, both of which are convex, and the two connected by a reverse curve, $c$, substantially as and for the purposes set forth.

3. A wheel rim or tire, A, having a main face or tread, $a$, and a recessed face or tread, $b$, connected by a reverse curve, $c$, and the said faces roughened or corrugated, as and for the purposes set forth.

In witness whereof I have hereunto signed my name in the presence of two subscribing witnesses.

ALFRED BRADY.

Witnesses:
HENRY CONNETT,
ARTHUR C. FRASER.